Patented June 9, 1931

1,809,422

UNITED STATES PATENT OFFICE

FRIEDRICH PASSEK, OF HAMBURG, GERMANY

METHOD OF MANUFACTURING SOLUTIONS OF CHOLESTERINE

No Drawing. Application filed February 14, 1929, Serial No. 340,003, and in Germany September 10, 1927.

The rising attention which cholesterine and its derivatives find as therapeutic means is founded chiefly upon the growing knowledge of the biological importance and value of cholesterine and its derivatives. In this regard reference is made to the investigations and reports brought out recently by Prof. R. Jaffé (Klinische Wochenschrift 1926, No. 12) and Dr. A. Eliassow (Dermatologische Wochenschrift 1926, No. 40).

In all cases, however, where cholesterine or the derivatives thereof are used for therapeutic purposes, the low degree of solubility thereof in diluted or aqueous solvents is objectionable or even a bar to such use. In order to prepare even a weak solution only, highly concentrated alcohols, such as ethylic alcohol or propylic alcohol, must be employed which sensitive persons cannot stand, while solutions prepared exclusively with the aid of stronger solvents, such as chloroform or any other chlorinated hydrocarbons, cannot be employed for obvious reasons.

The present invention relates to a new method of manufacturing solutions of cholesterine and the derivatives thereof for therapeutic purposes and the object of my invention is to provide an improved method of manufacturing said solutions with the aid of ethylic alcohol and water as the main constitutents of the solvent.

My invention viewed from its broadest aspect is based upon the observation that a solution of cholesterine or any derivatives thereof prepared with the aid of a comparatively small proportion of a suitable halogenated hydrocarbon, readily permits of being diluted with aqueous ethylic alcohol or spirit and other appropriate alcohols. Solutions of cholesterine or derivatives thereof, prepared as herein disclosed, are especially valuable for skin treatment.

If it is desired to obtain perfectly clear solutions, obviously certain conditions of concentration must be strictly observed which will depend upon the nature of the substance employed and may be previously ascertained and determined by experiment in each case according to its individual merits.

When aqueous ethylic alcohol or spirit is employed for the purpose of diluting the solution, it will be found that upon mixing the aqueous spirit with the cholesterine dissolved in the halogenated hydrocarbon, the solution will first become turbid, but the turbidity will disappear upon continued addition of spirit. As subsequently further spirit is added to the clear solution, the latter will again become turbid and finally precipitation will set in. Consequently it is advisable to carefully restrict and stop the addition of the diluting agent at the proper time in order to obtain clear, stable and lasting solutions containing 1 per cent of cholesterine or still more.

Among the organic liquids suited for use as a solvent for cholesterine in the presence of aqueous ethylic alcohol or spirit, there are besides chloroform mainly dichloride of ethylene, trichloro-ethylene, tetrachloride of carbon, dichloride of acetylene, tetrachloride of acetylene and the like, in general all of those halogenated hydrocarbons will be useful for the purpose in view which possess a marked solving capacity as regards cholesterine and, on the other hand, are themselves capable of dissolving more or less in diluted ethylic alcohol or spirit.

I shall now proceed to describe, for purposes of exemplification, a few ways of carrying the invention into effect practically.

*Example 1.*—1 gramme of cholesterine dissolved in 12.5 cubic centimetres of chloroform I dilute the solution thus obtained by slowly adding thereto about 70 to 80 cubic centimetres of spirit containing 60 cubic centimetres of absolute alcohol and 40 cubic centimetres of water. Upon the addition of the spirit the cholesterine solution first becomes turbid and is of milky appearance, but soon becomes clear again and will remain clear permanently if the stated amount of 70 to 80 cubic centimetres of spirit to be added, is not appreciably exceeded.

*Example 2.*—1 gramme of cholesterine is dissolved in 25 grammes of dichloride of ethylene and the solution thus produced is gradually mixed with a spirit composed of 96 grammes of absolute alcohol and 64 grammes of water.

*Example 3.*—1 gramme of cholesterine is dissolved in 25 grammes of trichloro-ethylene and a mixture of 70 grammes of water and 130 grammes of absolute alcohol is slowly added to the solution.

*Example 4.*—1 gramme of cholesterine is dissolved in 25 grammes of tetrachloride of carbon and a mixture of 120 grammes of absolute alcohol and 40 grammes of water is gradually added to the cholesterine solution.

*Example 5.*—0.5 gram cholesterine is dissolved in 6 c. cm. of chloroform, and there is then slowly added to the resulting solution 75 c. cm. of propyl alcohol of 60% strength. Any turbidity is removed by adding a small amount of propyl alcohol free from water.

*Example 6.*—1 gram cholesterine is dissolved in 12 c. cm. of chloroform, then mixed with 50 c. cm. propyl alcohol, and so much water added that no turbidness occurs.

*Example 7.*—1 gram cholesterine is dissolved in 12 c. cm. of carbon tetrachloride and mixed with a 60% watery solution of a mixture of methyl and propyl alcohol until the entire mixture starts to get turbid. A small amount of the mixture of methyl-propyl alcohol is added to remove the turbidness.

*Example 8.*—0.1 gram cholesterine stearic is dissolved in 10 c. cm. of chloroform and there is then added thereto 25 c. cm. of ethyl alcohol (96%). Thereafter small amounts, for instance 8 to 10 c. cm. water, is added.

*Example 9.*—0.1 gram cholesterine stearic + 0.5 gram pure cholesterine are dissolved in 10 c. cm. of chloroform, and there is then added 25 c. cm. alcohol (96%) and thereafter, in small portions, 8 to 10 c. cm. of water.

*Example 10.*—0.5 gram cholesterine stearic is dissolved in 10 c. cm. of chloroform, and 50 c. cm. propyl alcohol added. Thereafter there is added while stirring the solution 12 to 15 c. cm. of water in small quantities.

*Example 11.*—0.1 gram wool fat free of water is dissolved in 10 c. cm. of chloroform, and 50 c. cm. of a mixture of methyl and propyl alcohol added. Thereafter there is added while stirring the solution 12 to 15 c. cm. of water in small quantities.

*Example 12.*—0.1 gram wool fat free of water + 0.5 gram cholesterine is dissolved in 10 c. cm. chloroform, and 50 c. cm. of a mixture of methyl and propyl alcohol added. Thereafter there is added while stirring the solution 12 to 15 c. cm. of water in small quantities.

*Example 13.*—0.1 gram of wool fat at ordinary temperature has added thereto 15 c. cm. of propyl alcohol. No solution occurred, the fat only going into solution at a boiling heat, and the wool fat slowly dissolved. During cooling, turbidness occurred. After the addition of 10 c. cm. of water, the solution became flocky.

As set forth above, the cholesterine or derivatives thereof, after being dissolved in an aliphatic halogenated hydrocarbon, is treated with diluted alcohol. The alcohol added may be in a diluted state, or it may be alcohol almost free from water, in which case, in order to secure dilution, water is then added. Regardless of the specific procedure employed, the final step is the addition of dilute alcohol solution to the cholesterine dissolved in the halogenated aliphatic hydrocarbon. Instead of employing a single alcohol, alcohol mixtures may be employed such as a mixture of methyl and propyl alcohol.

Instead of using a single halogenated hydrocarbon for dissolving the cholesterine, a plurality of halogenated hydrocarbons may be used.

What I claim is:

1. The method of manufacturing a substantially clear aqueous alcoholic solution of cholesterine or derivatives thereof comprising dissolving cholesterine or derivatives thereof in a comparatively small quantity of an aliphatic halogenated hydrocarbon having a marked solvent power therefor, and diluting the resulting solution with such a quantity of a diluted alcohol as will ensure the production of a permanently clear solution.

2. The method of manufacturing a substantially clear aqueous alcoholic solution of cholesterine or derviatives thereof adapted to remain substantially permanently stable comprising dissolving cholesterine or derivatives thereof in a comparatively small quantity of an aliphatic halogenated hydrocarbon having a marked solvent power therefor and gradually adding a larger quantity of a diluted alcohol to the resulting solution until the latter first becomes turbid and then until the turbidity of the solution just disappears.

3. The method of manufacturing a substantially clear acqueous alcoholic solution of cholesterine or derivatives thereof adapted to remain substantially permanently stable comprising dissolving cholesterine or derivatives thereof in chloroform and diluting the resulting solution with such a quantity of a diluted alcohol as will allow the formation of a substantially clear product.

4. The method of manufacturing a substantially clear aqueous alcoholic solution of cholesterine or derivatives thereof adapted to remain substantially permanently stable comprising dissolving cholesterine or derivatives thereof in dichloride of ethylene and diluting the resulting solution with such a quantity of a diluted alcohol as will allow the formation of a substantially clear product.

5. The method of manufacturing an aqueous alcoholic solution of cholesterine or derivatives thereof adapted to remain substantially permanently stable comprising dissolving cholesterine or derivatives thereof in trichloro-ethylene and diluting the resulting solution with such a quantity of a diluted alcohol as will allow the formation of a substantially clear product.

In testimony that I claim the foregoing as my invention, I have signed my name hereto.

FRIEDRICH PASSEK.